(12) United States Patent
Rejman et al.

(10) Patent No.: US 10,090,708 B2
(45) Date of Patent: Oct. 2, 2018

(54) INDUCTIVE CHARGING DEVICE

(71) Applicant: Robert Bosch GmbH, Stuttgart (DE)

(72) Inventors: Marcin Rejman, Waiblingen (DE); Martin Gonda, Stuttgart (DE); Guenter Lohr, Leinfelden-Echterdingen (DE); Juergen Mack, Goeppingen (DE); Dragan Krupezevic, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 285 days.

(21) Appl. No.: 15/105,534

(22) PCT Filed: Nov. 27, 2014

(86) PCT No.: PCT/EP2014/075871
§ 371 (c)(1),
(2) Date: Jun. 16, 2016

(87) PCT Pub. No.: WO2015/090899
PCT Pub. Date: Jun. 25, 2015

(65) Prior Publication Data
US 2016/0322856 A1 Nov. 3, 2016

(30) Foreign Application Priority Data

Dec. 17, 2013 (DE) .......... 10 2013 226 234
Mar. 17, 2014 (DE) .......... 10 2014 204 919
Aug. 29, 2014 (DE) .......... 10 2014 217 272

(51) Int. Cl.
*H02J 50/10* (2016.01)
*H02J 7/00* (2006.01)
(Continued)

(52) U.S. Cl.
CPC ............ *H02J 50/10* (2016.02); *H02J 7/0042* (2013.01); *H02J 7/025* (2013.01); *H02J 50/70* (2016.02)

(58) Field of Classification Search
CPC .......... H02J 50/10; H02J 7/0042; H02J 7/025; H02J 50/70
See application file for complete search history.

(56) References Cited

U.S. PATENT DOCUMENTS

2011/0241617 A1  10/2011  Hoffman et al.
2013/0154552 A1   6/2013  Siessegger
(Continued)

FOREIGN PATENT DOCUMENTS

CN  103339698 A  10/2013
DE     9411279     12/1994
(Continued)

OTHER PUBLICATIONS

International Search Report dated Jan. 30, 2015, of the corresponding International Application PCT/EP2014/075871, filed on Nov. 27, 2014.

*Primary Examiner* — Robert Deberadinis
(74) *Attorney, Agent, or Firm* — Norton Rose Fulbright US LLP; Gerard Messina

(57) ABSTRACT

An inductive charging device, in particular a handheld power tool inductive charging device, having a housing, a receptacle region for accommodating an induction accumulator, a coil unit that includes at least one core element and at least one induction coil that at least partly encloses the at least one core element, and at least one coil housing element that positions at least the coil unit relative to the receptacle region in the housing.

22 Claims, 13 Drawing Sheets

(51) Int. Cl.
*H02J 7/02* (2016.01)
*H02J 50/70* (2016.01)

(56) References Cited

U.S. PATENT DOCUMENTS

2013/0193915 A1   8/2013   Jung et al.
2013/0237173 A1   9/2013   Saur

FOREIGN PATENT DOCUMENTS

| | | |
|---|---|---|
| DE | 102011003516 | 8/2012 |
| DE | 102012203485 | 9/2013 |
| JP | 2011034793 A | 2/2011 |
| JP | 2016508360 A | 3/2016 |
| JP | 2016509460 A | 3/2016 |

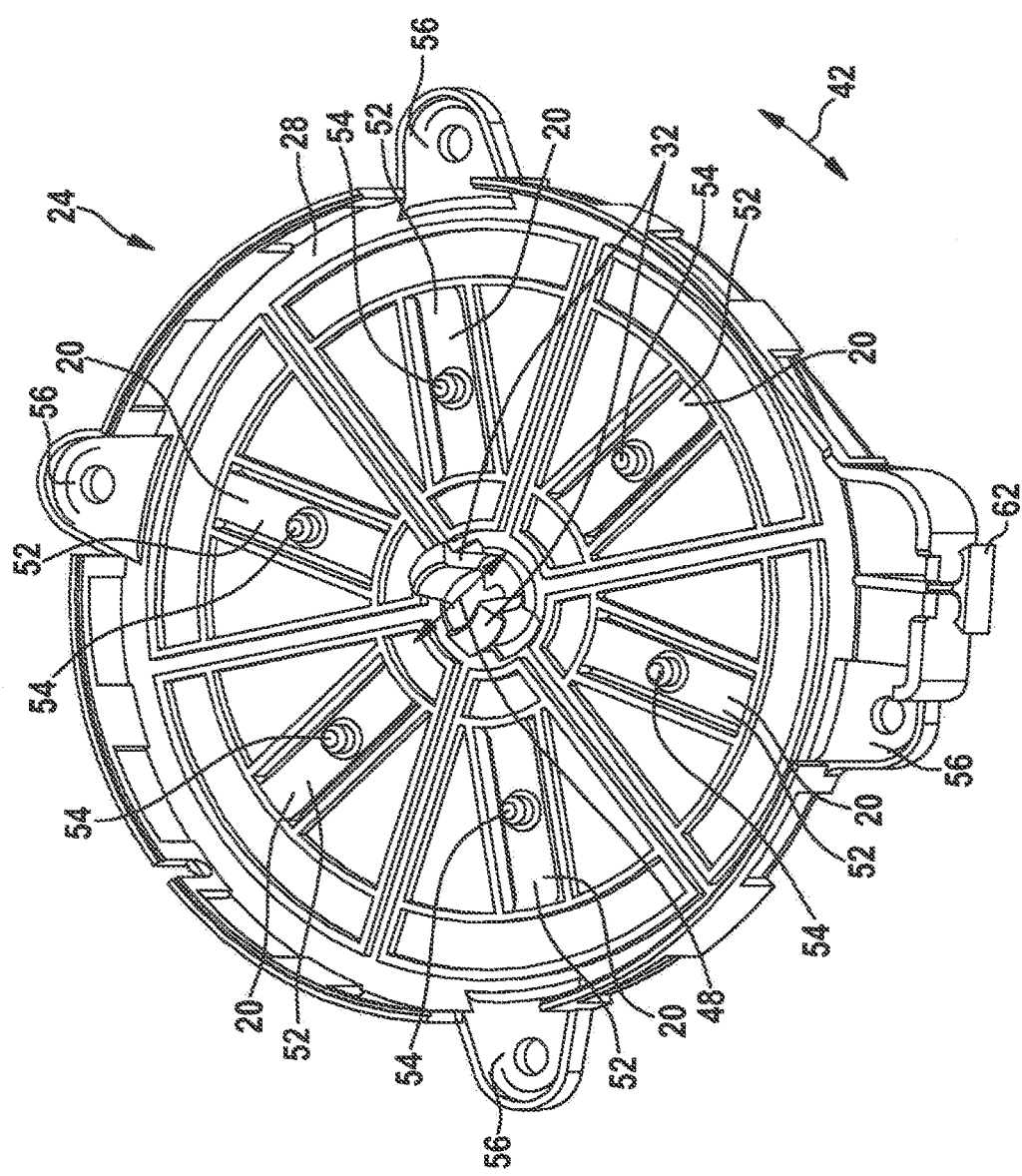

INDUCTIVE CHARGING DEVICE

BACKGROUND INFORMATION

An inductive charging device has already been proposed having a housing and a coil unit including at least one core element and at least one induction coil.

SUMMARY

The present invention relates to an inductive charging device, in particular an inductive charging device for a handheld power tool, having a housing, a receptacle region for accommodating an induction accumulator, a coil unit provided to transmit a quantity of energy in a state coupled to an induction accumulator, and including at least one core element and at least one induction coil that at least partly encloses the at least one core element. The inductive charging device further includes at least one coil housing element that, in the housing, positions at least the coil unit relative to the receptacle region.

In the present context, an "inductive charging device" is to be understood in particular as a unit for charging the at least one induction accumulator, the unit being provided to relay, in at least one charge state, a charge current to the induction accumulator at least partly through electromagnetic induction. In the present context, a "coil unit" is to be understood in particular as a unit that has the at least one induction coil having at least one winding made of an electrically conductive material, provided to generate, in at least one charge state, a magnetic field through an applied quantity of electrical energy, in particular through an alternating voltage, the magnetic field generating an electrical alternating current in an induction coil of the induction accumulator.

In particular, the coil unit, preferably the induction coil, is provided to convert an electromagnetic alternating field into an electrical alternating current and/or vice versa. Preferably, the alternating field has a frequency of 10-500 kHz, particularly preferably 100-120 kHz. In particular, the direction is oriented perpendicular to the coil plane, parallel to a winding axis of the induction coil. Preferably, the coil unit additionally includes the at least one core element in order to increase an inductance of the at least one induction coil.

The induction coil can have a substantially circular basic shape. Alternatively, the basic shape can also be non-circular. It can for example be oval, rectangular, or square. In the case of a rectangular or square basic shape, the corners can be rounded.

"Provided" is to be understood in particular as meaning specifically fashioned, designed, and/or equipped. The statement that an object is provided for a particular function is to be understood in particular as meaning that the object fulfills and/or executes this particular function in at least one state of use and/or operating state.

In the present context, an "induction accumulator" is to be understood in particular as a device that preferably includes a rechargeable energy storage unit that is provided at least in part to store a quantity of energy for generating an electrical current electrochemically via a reversible reaction, and to charge through the introduction of a charge current, and that is provided to supply power to an electrical machine, in particular a handheld power tool. Preferably, the induction accumulator has an interface unit that is fashioned to mechanically and electrically couple, in detachable fashion, the induction accumulator to a handheld power tool. The induction accumulator includes one or more accumulator cells. The induction accumulator can have at least one NiCd or NiMh accumulator cell. Preferably, the induction accumulator has at least one lithium-based accumulator cell. Other accumulator cell technologies may also be used. In the present context, a "handheld power tool" is to be understood in particular as an electrical device operated manually by a user, such as in particular a drill, a drilling hammer, a saw, a planer, a screwdriver, a miller, a grinder, an angle grinder, and/or a multifunction tool or a gardening tool such as a hedge trimmer, a shrubbery trimmer, and/or grass shears, or some other realization of the electrical device considered meaningful by a person skilled in the art.

In the present context, "at least partly enclosed" is to be understood in particular as meaning that the induction coil surrounds the at least one core element on at least one plane over an angular range of more than 180°, preferably more than 270°, particularly preferably 360°.

Through the design according to the present invention of the inductive charging device, in a constructively simple manner a preferably high degree of efficiency and an advantageously high degree of effectiveness can be achieved.

It is proposed that the coil housing element has at least one opening for accommodating the at least one induction coil. The opening is in particular fashioned in the shape of a groove. The induction coil is in particular placed into the opening by winding. The coil housing element thus acts as a coil bearer for the induction coil.

In addition, it is proposed that the coil housing element has at least one receptacle region for accommodating the at least one core element. In a preferred specific embodiment, the coil unit has a plurality of core elements, which are in particular identical in shape. The coil housing element has a number of receptacle regions corresponding in particular to the number of core elements. For each core element, the coil housing element has a receptacle region, so that each core element is accommodated in a separate receptacle region in the coil housing element. The core elements together form a core unit.

The coil housing element has in particular at least one holding element for detachable fastening to the housing of the inductive charging device. The holding element is, for example, realized as a retaining bracket. Using the retaining bracket, the coil housing element can for example be screwed to the housing of the inductive charging device. Alternative embodiments of a detachable fastening with which the coil housing element can be coupled to the housing of the inductive charging device with a positive fit and/or with a non-positive fit are also possible.

In addition, it is proposed that the inductive charging device has a second coil housing element that forms, with the first coil housing element, a coil housing unit. The coil housing unit accommodates at least the coil unit. The coil housing unit and the coil unit in this way form an assembly that at first can be assembled independently from the housing of the inductive charging device before being installed into the housing. The second coil housing element can have, alternatively or in addition to the at least one holding element of the first coil housing element, at least one holding element for detachable fastening to the housing of the inductive charging device.

In an advantageous embodiment, the coil housing unit includes at least one connecting element that detachably connects the two coil housing elements to one another in an assembled state. The connecting element can in particular be fashioned as a locking element. In the present context, a "locking element" is to be understood in particular as a spring-elastic means for producing a locking connection, provided so as to be capable of being elastically deflected during assembly. In this way, an advantageously simple and reliable coupling can be achieved of the at least two coil housing elements of the coil housing unit.

In particular, the coil housing unit is detachably fastened in the housing. For example, the coil housing unit can be detachably fastened, e.g., screwed, to the housing with the aid of the holding element of the first coil housing element. In this way, an advantageously secure and constructively simple connection can be achieved between the coil housing unit and the housing.

It is proposed that the inductive charging device includes at least one spring element that is at least in part provided to apply a force to at the least one core element acting at least partly toward the at least one induction coil.

In the present context, a "spring element" is to be understood in particular as a macroscopic element having at least one extension, in particular a main extension, that in a normal operating state can be changed by at least 1%, in particular by at least 2%, preferably by at least 5%, and particularly advantageously by at least 10%, and that in particular produces a counter-force that is a function of the change in the extension and is preferably proportional to the change and that counteracts the change. A "macroscopic element" is to be understood in particular as an element having an extension of at least 1 mm, in particular at least 5 mm, and preferably at least 10 mm. A "main extension" of an element is to be understood in particular as a length along a longest mid-fiber, in particular along a longest outer edge, of the spring element.

In addition, it is proposed that the at least one spring element exerts a force on the at least one core element in the direction of a receptacle region for accommodating the induction accumulator. In a state in which the induction accumulator is coupled to the inductive charging device, the induction accumulator is held in the receptacle region in at least one spatial direction, preferably in at least two spatial directions, with a positive fit and/or with a nonpositive fit. In this way, an advantageously small distance can be achieved between the at least one induction coil and the at least one core element, and in this way a preferably high degree of efficiency can be achieved.

It is provided that the at least one spring element and at least one of the at least two coil housing elements work together in such a way that the at least one core element is pre-tensioned toward the at least one induction coil. In particular, at least one of the at least two coil housing elements has the at least one spring element. In addition, the at least one spring element is connected in particular fixedly to at least one of the coil housing elements. The at least one spring element is fashioned in particular in one piece with at least one of the coil housing elements.

In a preferred embodiment, the coil unit has a plurality of core elements, in particular identical in shape, and the coil housing unit has a plurality of spring elements, in particular identical in shape. The spring elements each apply a force to one of the core elements acting at least partly toward the at least one induction coil.

In addition, it is proposed that the inductive charging device has a coil housing unit that at least partly encloses the coil unit and that has the at least one spring element. In the present context, "at least partly encloses" is to be understood in particular as meaning that the coil housing unit surrounds at least the coil unit the inductive charging unit in at least one plane, preferably in at least two planes in particular oriented perpendicular to one another, and particularly preferably in three planes in particular oriented perpendicular to one another, over an angular range of greater than 180°, preferably greater than 270°, and particularly preferably 360°. Preferably, the coil housing unit covers in particular at least 40%, preferably at least 50%, preferably at least 60%, and particularly preferably at least 70% of a surface of the coil unit. In this way, a preferably robust and advantageous modular realization of the inductive charging device can be achieved.

In addition, it is proposed that the at least one spring element is fixedly connected to the coil housing unit. In the present context, "fixedly connected" is to be understood in particular as meaning that the at least one spring element and the coil housing unit are connected to one another so as to be incapable of being separated without destruction. In this way, a preferably compact realization of the inductive charging device is achieved.

In addition, it is proposed that the at least one spring element is fashioned in one piece with the coil housing unit. In the present context, "in one piece" is to be understood in particular as meaning connected with at least a material bond, for example through a welding process, a gluing process, an injection process, and/or some other process considered meaningful by a person skilled in the art, and/or is to be understood as advantageously shaped in one piece, such as for example through production from a mold and/or through production in a one- or multi-component injection method, advantageously from a single blank. In this way, a preferably compact and component-saving realization of the inductive charging device can be achieved.

In addition, it is proposed that the at least one induction coil includes at least two coil terminals that are situated at a distance from one another. In the present context, a "coil terminal" is to be understood in particular as an element that is provided to connect the at least one induction coil electrically to a power source and/or to a storage unit such as to at least one battery, preferably directly. In the present context "at a distance" is to be understood in particular as meaning that a least distance between the at least two coil terminals is in particular at least 5 mm, preferably at least 10 mm, preferably at least 20 mm, and particularly preferably at least 30 mm. In this way, an advantageously high degree of electrical insulation, in particular up to 1500 V, can be achieved.

In addition, it is proposed that the at least one spring element and at least one of the at least two coil housing elements are provided to clamp the at least one core element in an assembled state. Here, the at least one spring element and at least one of the at least two coil housing elements work together in such a way that the at least one core element is pre-tensioned toward the at least one induction coil. In this way, a preferably high degree of efficiency, a preferably high degree of effectiveness, and a constructively simple fixing of the core elements in a charge state can be achieved.

In addition, it is proposed that the coil unit has a plurality of core elements, in particular identical in shape, and a plurality of spring elements, in particular identical in shape, that respectively apply a force to one of the core elements acting at least partly toward the at least one induction coil. In this way, a preferably high degree of efficiency and a preferably high effectiveness in a charge state can be achieved.

In addition, it is proposed that the inductive charging device has a shielding element that is fashioned to reduce electromagnetic interference. The shielding element is in particular fashioned to form a bypass capacitor with the induction coil of the inductive charging device. Here, the induction coil forms a first electrode of the bypass capacitor and the shielding element forms a second electrode of the bypass capacitor. The shielding element includes at least one electrically conductive element that forms an electrically conductive layer. The electrically conductive element is in particular made of a non-metallic material, and in particular a non-ferromagnetic material. The electrically conductive element is preferably fashioned from carbon fibers as a fabric structure, for example a sheet, a mesh, a weave, or the like. The shielding element further includes at least two insulating elements that form insulating layers. The electrically conductive element is situated between the two insulating elements. A generally peripheral edge region of the shielding element is free of electrically conductive material of the electrically conductive element. In this edge region, the two insulating elements are situated directly abutting one another, without electrically conductive material of the electrically conductive element being situated between them. The shielding element further includes an electrically conductive contact element for the electrical contacting of the shielding element. The shielding element is connected in particular to ground via the electrically conductive contact element.

The shielding element is situated in particular between the receptacle region of the inductive charging device and the induction coil. Here, the shielding element is situated relative to the induction coil in such a way that during a charge process of the induction accumulator with the inductive charging device, the shielding element is situated between the induction coil of the inductive charging device and the induction coil of the induction accumulator. The shielding element is situated entirely in particular between the receptacle region and the coil unit. In addition, the shielding element is situated in particular between the receptacle region and the inductive charging unit. In addition, the shielding element is in particular situated between the receptacle region and the coil housing unit. In addition, the shielding element is situated in particular between the receptacle region and the coil housing element oriented toward the receptacle region. In the situation of the shielding element between the receptacle region and the induction coil, a distance that is as small as possible between the shielding element and the induction coil is advantageous.

In an advantageous embodiment, the shielding element has a surface extension that corresponds at least to the extension of the surface formed by the induction coil. The surface formed by the shielding element is accordingly at least as large as the surface formed by the induction coil. The shielding element is in particular fashioned generally over the entire surface. Given a situation of the shielding element between the receptacle region and the induction coil, the shielding element thus covers the induction coil generally completely.

The basic shape of the shielding element can be matched to the basic shape of the induction coil. Given a generally circular induction coil, the shielding element preferably has a generally round basic shape. Given a non-circular induction coil, for example having an oval, rectangular, or square shape, the shielding element is preferably also not round, and is for example made with an oval, rectangular, or square shape.

In a further embodiment, the shielding element includes a floor element and at least one wall element situated on the floor element. Here, the floor element forms a base surface whose extension corresponds at least to the extension of the surface formed by the induction coil. The base surface formed by the floor element is accordingly at least as large as the surface formed by the induction coil. At least in the installed position of the shielding element in the inductive charging device, the wall element is inclined relative to the floor element, and in particular is configured so as to be inclined generally at an angle of 90°. In the installed position, the wall element stands out generally perpendicularly from the floor element. The at least one wall element forms a peripheral wall of the shielding element that generally completely encloses the induction coil at its outer periphery. The peripheral wall of the shielding element can also be fashioned from a plurality of wall elements.

In addition, it is proposed that the inductive charging device has a further shielding element that is fashioned to reduce electromagnetic interference. The shielding element is fashioned in particular to shield the induction coil during a charging process of an induction accumulator against metallic objects that are situated on a support surface for the inductive charging device, for example a table surface. A support surface made of a metallic material, or metallic particles on the support surface, have a disadvantageous influence on the functioning of the induction coil. In order to achieve the shielding of the induction coil against metallic objects on a support surface for the inductive charging device, the shielding element is situated in particular between a housing element of the housing of the inductive charging device and the induction coil. Here, the shielding element is oriented toward a side of the induction coil that is oriented away from the receptacle region. Accordingly, the shielding element is situated at a side of the induction coil that is oriented toward a support surface of the housing of the inductive charging device. This shielding element can be provided alternatively to or in addition to the shielding element described above, which is situated between the induction coil and the receptacle region.

The shielding element is situated in particular between the housing element, which forms a support surface of the inductive charging device, and the inductive charging device. Here, the shielding element is situated outside the inductive charging device. The shielding element is situated between the coil housing unit and the housing element forming a support surface. In an alternative specific embodiment, the shielding element can also form an element of the inductive charging device in that the shielding element is situated inside the inductive charging unit. Here, the shielding element can be situated in the coil housing unit.

The shielding element is made of an electrically conductive material, advantageously a metallic material, for example aluminum.

In an embodiment, the shielding element is fashioned generally with an annular shape. In an alternative embodiment, the shielding element can also be made disk-shaped, the shielding element in particular being fashioned generally over the entire surface. The basic shape of the shielding element is advantageously matched to the basic shape of the induction coil. For shielding an induction coil that is generally circular, the shielding element is likewise made with a circular shape. For shielding a non-circular induction coil, made for example with an oval, rectangular, or square shape, the geometric basic shape of the shielding element is matched to the basic shape of the induction coil, and is likewise made for example with an oval, rectangular, or square shape.

In addition, advantageously the cross-sectional surface of the shielding element is matched to the cross-sectional surface of the induction coil. Preferably, the shielding element has a surface extension that corresponds at least to the extension of the surface formed by the induction coil. The surface formed by the shielding element is accordingly at least as large as the surface formed by the induction coil. For example, a generally circular shielding element preferably has an outer diameter that is at least as large as the outer diameter of the induction coil. Analogously, given a non-circular basic shape a projection surface of the shielding element, formed by a projection of the shielding element along an axial direction of the inductive charging unit, is at least as large as the projection surface of the induction coil formed by such a projection of the induction coil along the axial direction.

In addition, a system is proposed having an inductive charging device according to the present invention and having at least one induction accumulator, in particular having at least one handheld power tool induction accumulator.

The inductive charging device according to the present invention is here not to be limited to the use and specific embodiment described above. In particular, the inductive charging device according to the present invention can have, in order to fulfill a function described herein, a number of individual elements, components, and units differing from a number named herein.

Further advantages result from the following description of the figures. The figures show an exemplary embodiment of the present invention. The figures and the description contain numerous features in combination. A person skilled in the art will usefully also consider the features individually and combine them to form further meaningful combinations.

BRIEF DESCRIPTION OF THE DRAWINGS

FIG. 3 shows a coil housing element of the coil housing unit of the inductive charging device according to the present invention in a perspective view.

DETAILED DESCRIPTION OF EXAMPLE EMBODIMENTS

Figure 1:
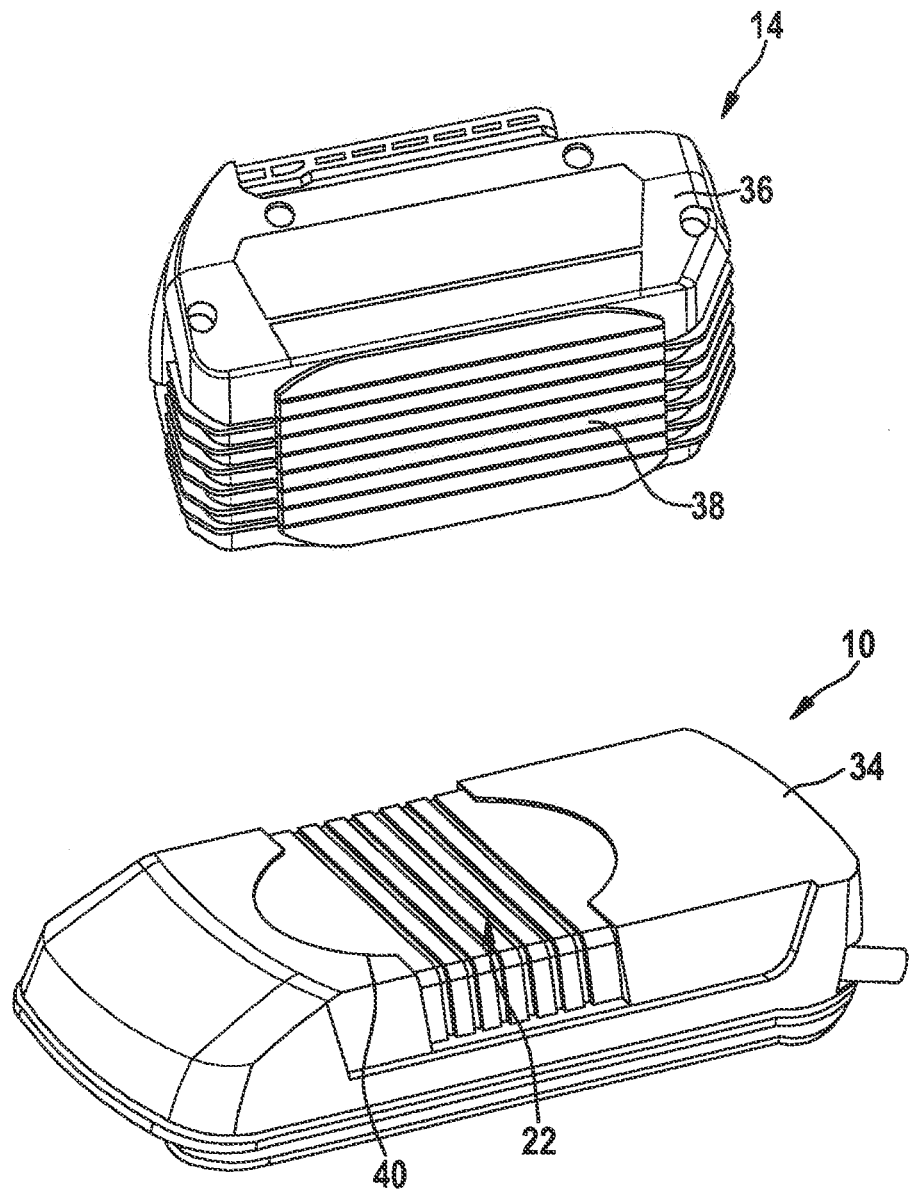
FIG. 1 shows a system having an inductive charging device according to the present invention and having an induction accumulator, in a perspective representation.
Figure 7:
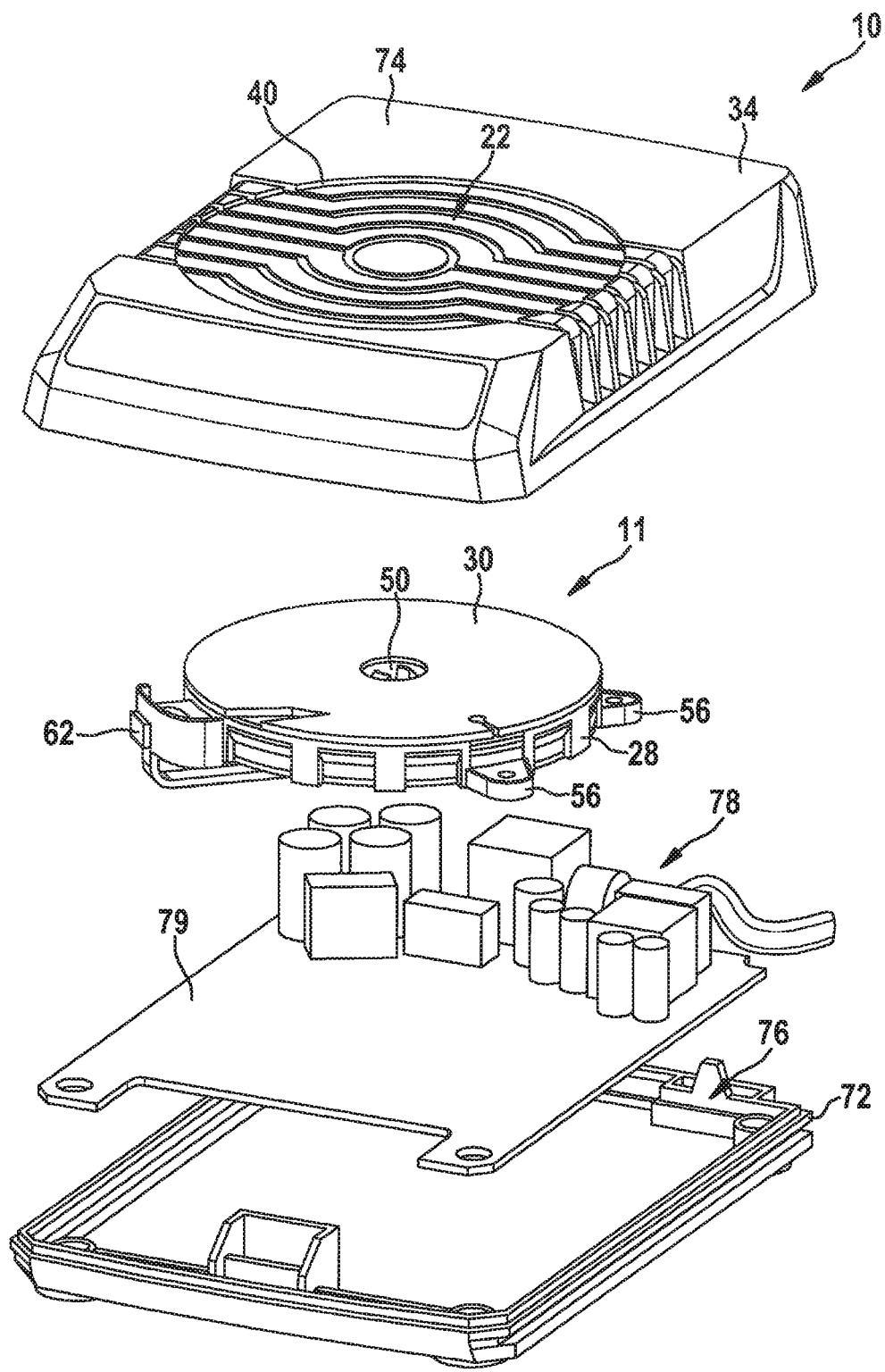
FIG. 7 shows the inductive charging device according to the present invention before assembly of the components, in a perspective representation.

FIG. 1 shows a system having an inductive charging device 10 and having an induction accumulator 14. Inductive charging device 10 is provided to electrically charge induction accumulator 14, in a charge state. Induction accumulator 14 is fashioned as an induction accumulator for a handheld power tool. Induction accumulator 14 is fashioned so as to be capable of being charged inductively by inductive charging device 10. Induction accumulator 14 is fashioned so as to be capable of being coupled to inductive charging device 10. Inductive charging device 10 is provided to transmit a quantity of energy to induction accumulator 14, in a state in which it is coupled with induction accumulator 14. For this purpose, induction accumulator 14 has an induction coil not shown in more detail. Inductive charging device 10 is fashioned as a handheld power tool inductive charging device. Inductive charging device 10 is fashioned as an inductive charging apparatus. Inductive charging device 10 has a housing 34. Housing 34 encloses an inductive charging unit 11. Inductive charging unit 11 includes a coil unit 12 and a coil housing unit 24. Housing 34 acts as external housing of inductive charging device 10. Coil unit 12 is provided for an inductive transfer of energy, in a charge state, to induction accumulator 14. Inductive charging device 10 further includes an electronics unit 78 that is provided to control or to regulate a charging process (FIG. 7).

Housing 34 of inductive charging device 10 has a receptacle region 22 that is provided to accommodate induction accumulator 14 in a coupled state. Induction accumulator 14 also has a housing 36 that has a positioning element 38 for coupling induction accumulator 14 to receptacle region 22 of housing 34 of inductive charging device 10 in a coupled state. Positioning element 38 of induction accumulator 14 is fashioned as a platform that is raised above an external surface of adjoining housing 36 of induction accumulator 14. Receptacle region 22 of housing 34 of inductive charging device 10 has at least one recess. The recess forms a positioning element 40 for positioning induction accumulator 14. However, it is also possible for positioning element 40 of inductive charging device 10 to be fashioned as a platform and for positioning element 38 of induction accumulator 14 to be fashioned as a recess. The recess has a shoulder height of at least 0.5 mm. Positioning element 40 of inductive charging device 10 and positioning element 38 of induction accumulator 14 are made in corresponding fashion.

Positioning element 40 of inductive charging device 10 and positioning element 38 of induction accumulator 14 each have a shoulder height of 3 mm. However, other dimensions considered meaningful by a person skilled in the art are also possible. Positioning element 40 of inductive charging device 10 has a partly curved external contour. The external contour of positioning element 40 of inductive charging device 10 is made round. Positioning element 38 of induction accumulator 14 has a partly curved external contour. The external contour of positioning element 38 of induction accumulator 14 is made square with rounded corners. A diameter of positioning element 40 of inductive charging device 10 corresponds at least approximately to a diagonal length of positioning element 38 of induction accumulator 14. Between the dimensions of positioning element 40 of inductive charging device 10 and of positioning element 38 of induction accumulator 14, a small tolerance is provided. Alternatively, it is also possible for the external contour of positioning element 40 of inductive charging device 10 to be made square with rounded corners and for the external contour of positioning element 38 of induction accumulator 14 to be made round. In addition, it is also possible that the external contour of positioning element 40 of inductive charging device 10 or of positioning element 38 of induction accumulator 14 has some other geometric shape that appears meaningful to a person skilled in the art, for example a rectangular shape, in particular having rounded corners. In a charge state, induction accumulator 14 is situated on inductive charging device 10 in such a way that positioning element 38 of induction accumulator 14 engages in positioning element 40 of inductive charging device 10. Here, housing 36 of induction accumulator 14 contacts housing 34 of inductive charging device 10 directly.

Figure 4:
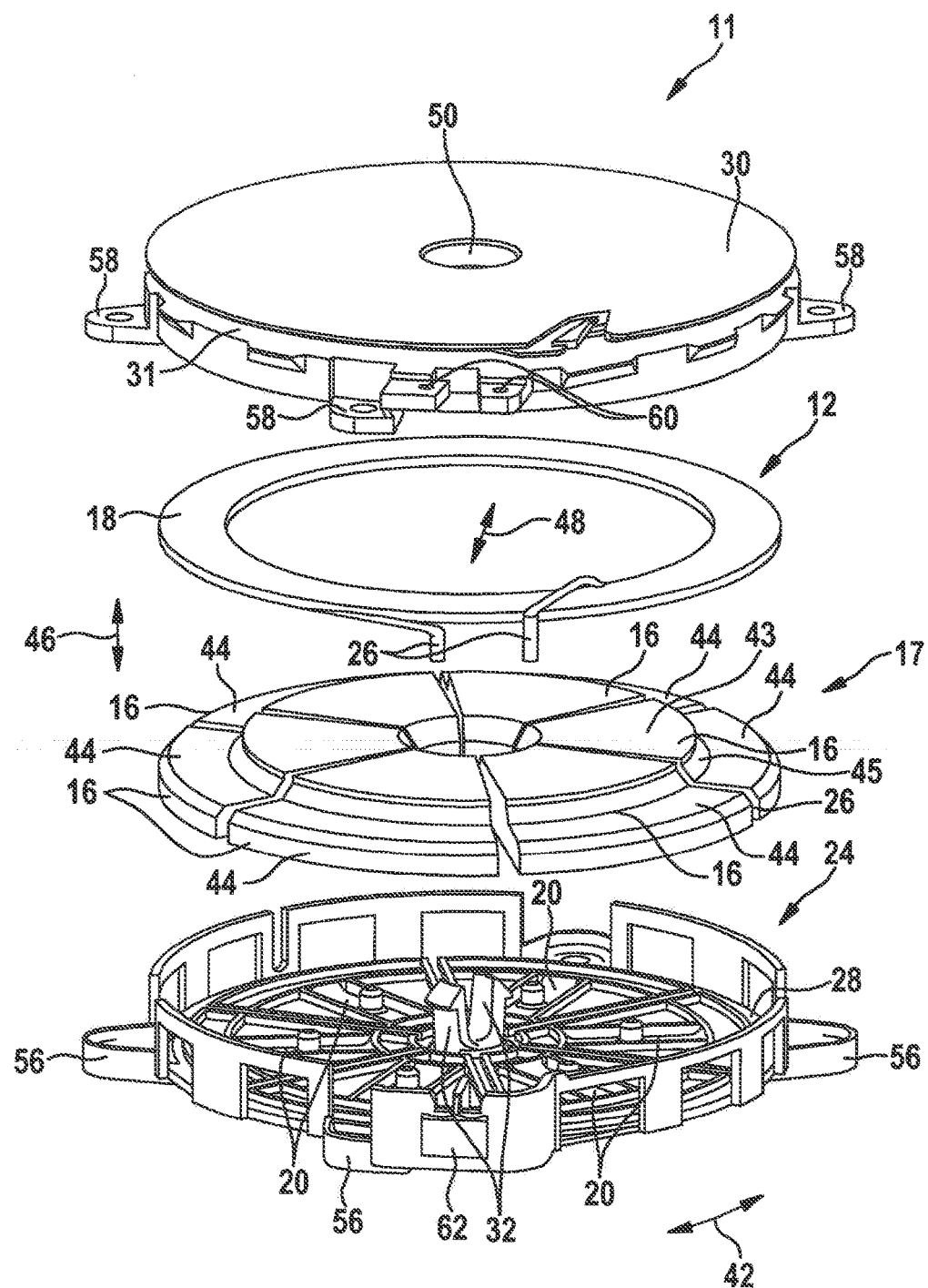
FIG. 4 shows the coil housing unit and the coil unit, as well as the core unit, of the inductive charging device according to the present invention before assembly of the components, in a perspective representation in a top view.
Figure 5:
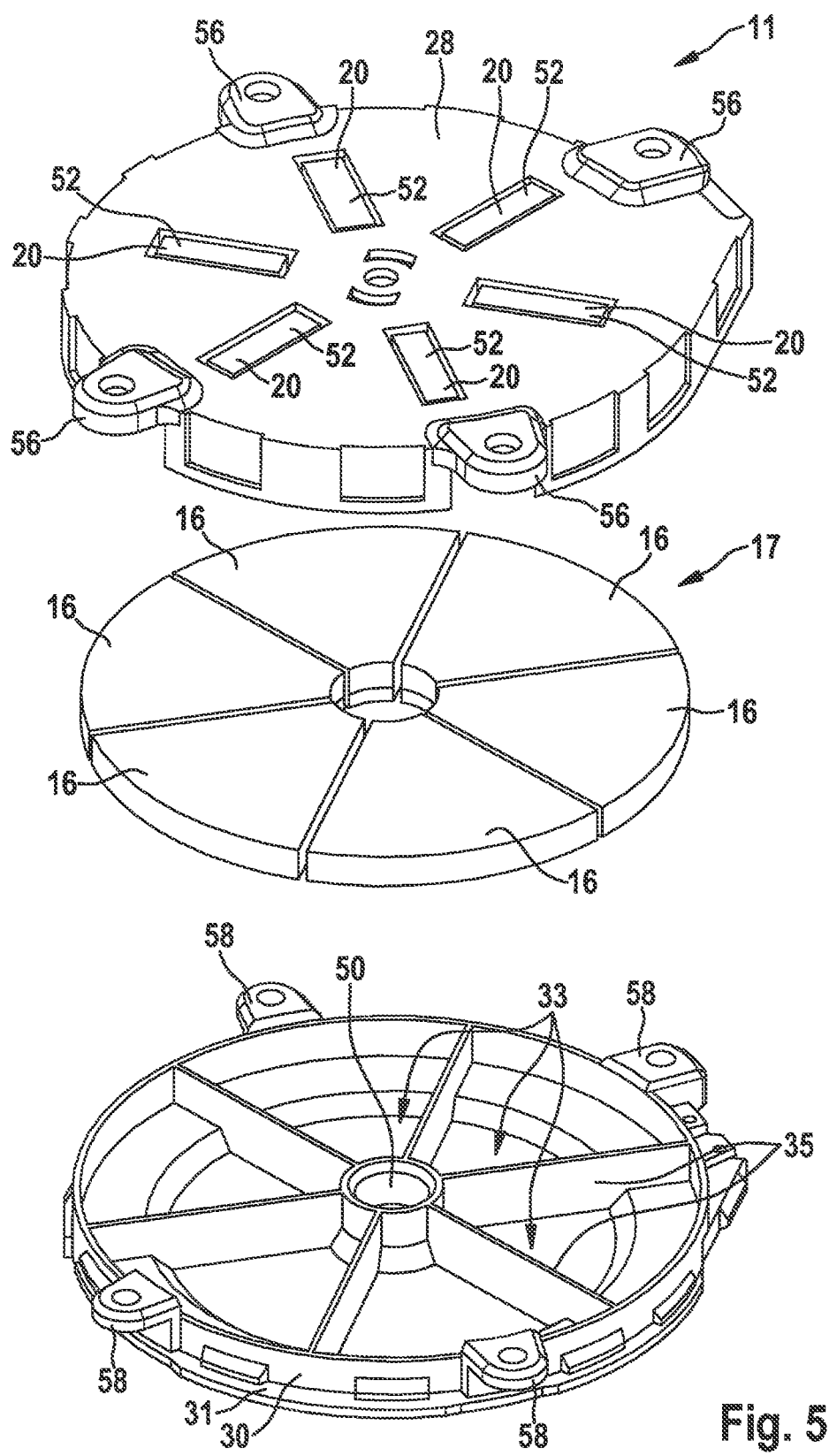
FIG. 5 shows the coil housing unit and the core unit of the inductive charging device according to the present invention before assembly of the components, in a perspective representation in a view from below.
Figure 6:
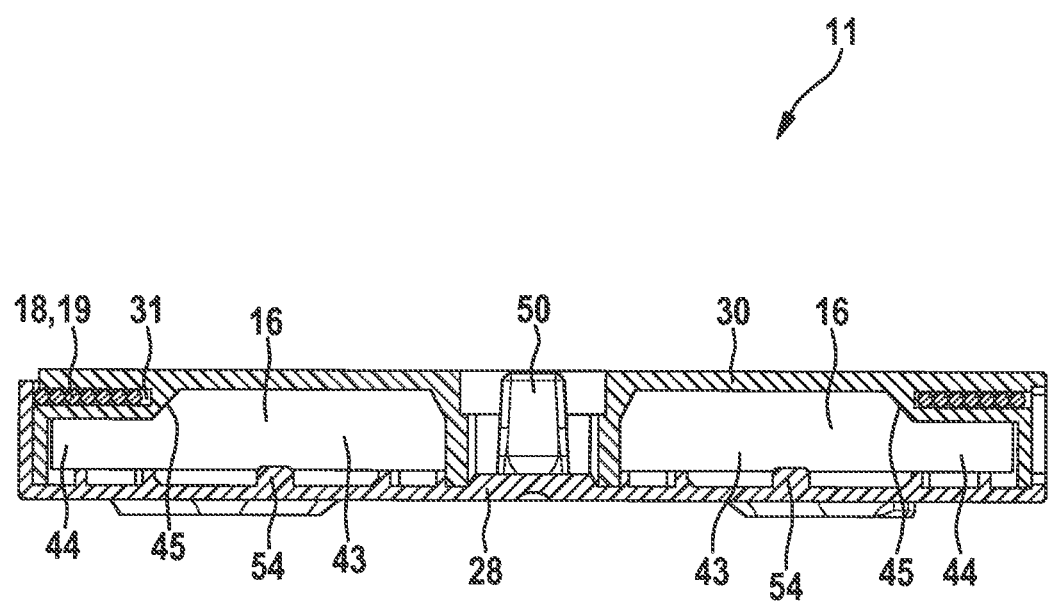
FIG. 6 shows the coil housing unit and the coil unit, as well as the core unit, of the inductive charging device according to the present invention after an assembly of the components, in cross-section.

Inductive charging device 10 has coil unit 12, which is provided to transmit a quantity of energy in a state in which it is coupled to an induction accumulator 14. In the coupled state, electrical energy is transmitted from inductive charging device 10 to induction accumulator 14 using coil unit 12. Coil unit 12 includes at least one core unit 17 and at least one induction coil 18 that at least partly encloses the at least one core unit 17 (FIGS. 4, 6). In the exemplary embodiment shown in FIGS. 4 and 5, core unit 17 includes six core elements 16 that are generally identical in shape. A different number of core elements 16 that appears meaningful to a person skilled in the art is also possible. More than six core elements, e.g. eight core elements, or fewer than six core elements, e.g. four core elements, may also be used. Core elements 16 together form core unit 17. Core unit 17 has a generally circular cross-section. A cross-section other than circular is also possible. For example, the core unit can have a generally rectangular cross-section, and in this case the corners can in particular be made rounded. Core elements 16 are each fashioned as partial circles. In an assembled state, core elements 16 are situated alongside one another in such a way that the six core elements 16 together form a generally circular contour. Core elements 16 form circular sectors, generally identical in shape, of core unit 17, which is generally circular in shape. Core elements 16 each have a protrusion 44 in a region of core elements 16 pointing outward in radial direction 48. Protrusion 44 is provided on a side of core element 16 facing induction coil 18. In the region of protrusion 44, the respective core element 16 has a smaller extension in axial direction 46 than in the region of a basic element 43 (FIGS. 4, 6). In the region between basic element 43 and protrusion 44 there is fashioned a shoulder 45. The outer circular contour of protrusion 44 has a larger diameter than the contour, pointing radially outward in the region of shoulder 45, of basic element 43. The side of core element 16 facing induction coil 18 is formed by a generally flat surface (FIG. 5). Core unit 17 is provided in order to increase an inductance of the at least one induction coil 18. Core elements 16 are made of a metal. Core elements 16 are fashioned as ferrite cores.

Induction coil 18 encloses core elements 16, in an assembled state, in peripheral direction 42 in at least one plane (FIG. 6). In the specific embodiment shown in FIG. 6, induction coil 18 has a plurality of windings 19 situated one over the other. Induction coil 18 has two coil terminals 26 fashioned at a distance from one another.

Induction coil 18 has a round contour. From FIG. 4 in particular it can be seen that induction coil 18 has a generally circular basic shape. The induction coil can alternatively also have a noncircular basic shape, for example an oval, rectangular, or square basic shape (not shown).

Figure 2A:
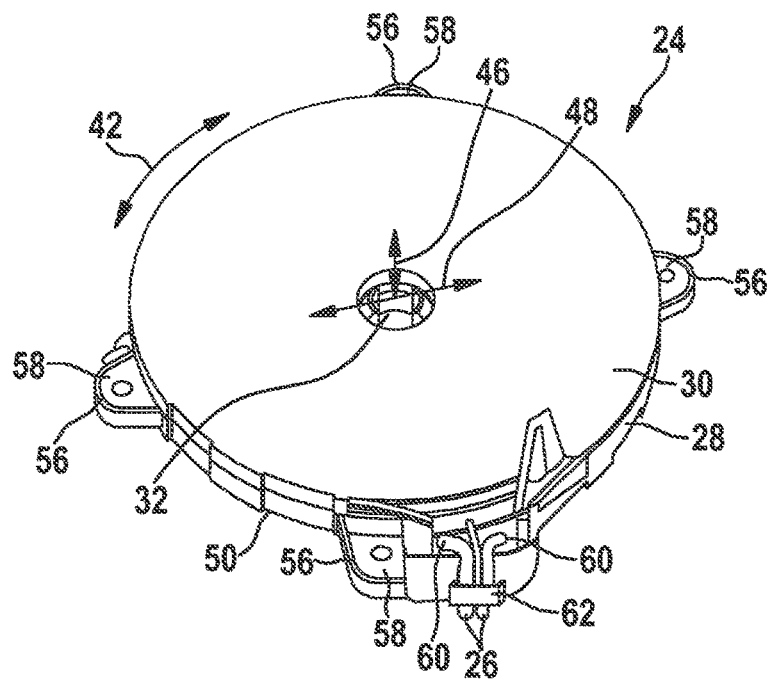
FIG. 2a shows a coil unit, enclosed by a coil housing unit, of the inductive charging device according to the present invention in a perspective representation, in a top view.
Figure 2B:
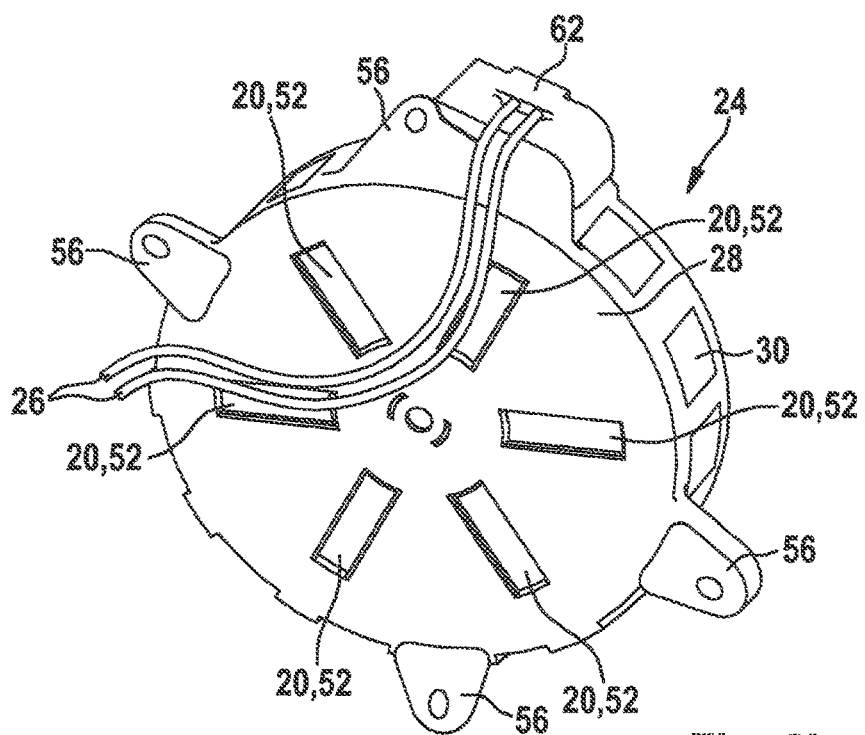
FIG. 2b shows the coil unit, enclosed by the coil housing unit, of the inductive charging device according to the present invention in a perspective representation, in a view from below.

Inductive charging device 10 has in addition a first coil housing element 28. Inductive charging device 10 moreover has a second coil housing element 30. Coil housing elements 28, 30 together form coil housing unit 24. Coil housing unit 24 encloses coil unit 12. Coil housing unit 24 and coil unit 12 form inductive charging unit 11. Coil housing unit 24 has an external contour that is for the most part cylindrical (FIGS. 2a, 2b). Coil housing unit 24 has two coil housing elements 28, 30 that in an assembled state are coupled to one another via at least one connecting element. Coil housing elements 28, 30 each have at least one connecting element fashioned so as to correspond respectively to the connecting element of the respective other coil housing element 28, 30. In the depicted specific embodiment of core housing unit 24 according to FIGS. 3, 4, and 5, the corresponding connecting elements are realized as locking elements. Coil housing elements 28, 30 are detachably coupled to one another via corresponding locking elements 32, 50. A first of the coil housing elements 28 has two locking elements 32 (FIG. 3). Locking elements 32 are fixedly connected to first coil housing element 28. Locking elements 32 are fashioned in one piece with first coil housing element 28. Locking elements 32 are formed by snap hooks. Locking elements 32 are situated in a center of first coil housing element 28. Locking elements 32 are made so as to be spring-elastically capable of being deflected in radial direction 48 of first coil housing element 28. Second coil housing element 30 has a locking opening 50 that is fashioned corresponding to locking elements 32 of first coil housing element 28. Locking opening 50 is situated in a center of further coil housing element 30. In an assembled state, locking elements 32 of first coil housing element 28 engage through locking opening 50 of the other coil housing element 30, and are locked thereto (FIGS. 2a, 2b, 6). Alternative specific embodiments are also possible of the mutually corresponding locking elements 32, 50 for the detachable coupling of the two coil housing elements 28, 30.

Coil housing element 30 is provided to accommodate induction coil 18. Coil housing element 30 is fashioned as a coil bearer. For this purpose, coil housing element 30 has a groove-shaped opening 31 in peripheral direction 42. Windings 19 of induction coil 18 are accommodated in groove-shaped opening 31. Windings 19 are placed into groove-shaped opening 31. Windings 19 are wound on into groove-shaped opening 31.

In addition, coil housing element 30 is provided to accommodate core unit 17. Coil housing element 30 has at least one receptacle region for core unit 17. In the specific embodiment shown in FIG. 5, coil housing element 30 has a number of receptacle regions 33 corresponding to the number of core elements 16. Thus, for each core element 16 a receptacle region 33 is provided for accommodating a core element 16. Receptacle region 33 generally completely accommodates core element 16. Receptacle region 33 has a shape generally corresponding to the shape of core element 16. In FIG. 5, it can be seen that receptacle region 33 generally matches the contour, formed from basic element 43, protrusion 44, and shoulder 45, of the side of core element 16 facing induction coil 18. Each receptacle region 33 is limited by two side walls 35. Two adjacent receptacle regions 33 are separated from one another by a side wall 35. With the aid of side wall 35, two core elements 16 situated adjacent to one another are situated at a distance from one another.

In an assembled state, core elements 16 and induction coil 18 of coil unit 12 are at least almost completely enclosed in coil housing element 30.

Inductive charging device 10 has in addition at least one spring element 20 that at least in part is provided to apply a force to the at least one core element 16 acting at least partly toward the at least one induction coil 18. Inductive charging device 10 includes six spring elements 20 having identical shape that are each provided to apply a force to one of the core elements 16 acting toward induction coil 18. Spring elements 20 each press core elements 16 in axial direction 46 toward induction coil 18. Spring elements 20 each apply a force on core elements 16 in axial direction 46 in the direction of receptacle region 22 of inductive charging device 10 for the accommodation of induction accumulator 14. Inductive charging unit 11 of inductive charging device 10 has the at least one spring element 20. Here, coil housing unit 24 has the at least one spring element 20. Spring elements 20 are fixedly connected to coil housing unit 24. First coil housing element 28 has the at least one spring element 20. Spring elements 20 are fixedly connected to first coil housing element 28 of coil housing unit 24. Spring elements 20 are fashioned in one piece with coil housing unit 24. Spring elements 20 are fashioned in one piece with first coil housing element 28 of coil housing unit 24. Spring elements 20 press core elements 16 in axial direction 46 toward second coil housing element 30, which has groove-shaped opening 31 for accommodating induction coil 18. Thus, spring elements 20 of first coil housing element 28 press core elements 16 in the axial direction toward induction coil 18 in second coil housing element 30.

In an alternative specific embodiment (not shown), second coil housing element 30 can have the at least one spring element. The alternative spring element can also be provided to apply a force to the at least one core element 16 acting at least partly toward the at least one induction coil 18. The alternative spring element can be connected fixedly to second coil housing element 30. The alternative spring element can in particular be fashioned in one piece with second coil housing element 30.

Spring elements 20 each have a spring body 52 and an extension 54. Spring body 52 of spring element 20 is made with a plate shape and has a material thickness that is small in comparison to a length in the main direction of extension. Spring body 52 of spring element 20 has a rectangular contour along a main plane of extension. Spring body 52 of spring element 20 is directly connected at the head side to first coil housing element 28. Spring body 52 of spring element 20 is fashioned at the head side in one piece with first coil housing element 28. Longitudinal sides of spring body 52 of spring element 20 are each situated at a distance, via a slit, from first coil housing element 28. Spring element 20 is not connected directly to first coil housing element 28 via the longitudinal sides of spring body 52 of spring element 20. In this way, spring body 52 of spring element 20 is made in spring-elastic fashion. Extension 54 of spring element 20 is situated centrically on spring body 52 in the main plane of extension of spring body 52. Extension 54 is fashioned in one piece with spring body 52 of spring element 20. Extension 54 is made with a cylindrical shape, an axis of rotation of cylindrically fashioned extension 54 running parallel to the main plane of extension of spring body 52. In an assembled state, extension 54 of each spring element 20 contacts a respective core element 16. Extension 54 of spring element 20 transmits the spring force of spring body 52 of spring element 20 directly onto the respective core element 16, and in this way presses core element 16 toward receptacle region 22 and toward the rest of coil housing element 30. Spring elements 20, which are fashioned in one piece with first coil housing element 28, and further coil housing element 30 are provided to clamp core elements 16 in an assembled state. Alternatively or in addition, it is also possible that the at least one spring element 20 is made at least partly of an elastomer or in some other manner considered meaningful by a person skilled in the art.

During an assembly, in a first step induction coil 18 and core elements 16 of coil unit 24 are placed into coil housing element 30 of coil housing unit 24. Subsequently, first coil housing element 28, which has spring elements 20, of coil housing unit 24 is pushed over the rest of coil housing element 30 and is pressed in axial direction 46 so far that first coil housing element 28 and further coil housing element 30 of coil housing unit 24 are completely situated one over the other. Here, first coil housing element 28 completely surrounds further coil housing element 30 in peripheral direction 42. In the depicted specific embodiment, coil housing elements 28, 30 of coil housing unit 24 each have at least one retaining bracket 56, 58. Coil housing elements 28, 30 of coil housing unit 24 each have a total of four retaining brackets 56, 58. Retaining brackets 56, 58 are distributed uniformly around a periphery of coil housing elements 28, 30 of coil housing unit 24. Retaining brackets 58 of further coil housing element 30 each engage, in a coupled state of coil housing unit 24, in a retaining bracket 56 of first coil housing element 28. Retaining brackets 56, 58 each have a fastening recess through which, in an assembled state, a screw engages by which coil housing unit 24 is screwed to housing 34 of inductive charging device 10. In an assembled state, coil housing unit 24 is thus screwed together with housing 34 of inductive charging device 10. Through the screwing of coil housing unit 24 to housing 34 of inductive charging device 10, in addition first coil housing element 28 and further coil housing element 30 are clamped to one another and are secured relative to one another, and inductive charging unit 11 is positionally secured relative to receptacle region 22 of the inductive charging device. As is explained below in connection with FIG. 9, for the screwing of coil housing unit 24 to housing 34, holding elements 59 are provided in the form of screw bosses.

Retaining brackets 56, 58 and screw bosses 59 represent a specific embodiment of holding elements that are fashioned to detachably fasten at least one of coil housing elements 28, 30 to housing 34, and to position them relative to receptacle region 22. Alternative specific embodiments for holding elements for the detachable fastening of inductive charging unit 11 to housing 34 and for positioning inductive charging unit 11 relative to receptacle region 22 are possible. For example, the holding elements can be realized in the form of locking elements or other connecting elements for positive and/or non-positive connection.

Coil housing element 30 of coil housing unit 24 has in addition two coil terminal feedthroughs 60 that are provided to guide coil terminals 26 of induction coil 18 from an interior of coil housing unit 24 to the outside in an assembled state (FIG. 2a). Coil terminal feedthroughs 60 are fashioned by openings in further coil housing element 30. Coil terminal feedthroughs 60 are situated at a distance from one another. First coil housing element 28 has a coil terminal holding element 62, which are provided to fasten and to hold coil terminals 26 of induction coil 18 from an interior of coil housing unit 24 in an assembled state (FIG. 2b). Coil terminal holding element 62 fastens coil terminals 26 of induction coil 18 externally on coil housing unit 24. Coil terminal holding element 62 fastens coil terminals 26 of induction coil 18 at a distance from one another. In this way, a high degree of electrical insulation, in particular up to 1500 V, can be achieved.

FIG. 7 shows inductive charging device 10 before assembly, in a perspective representation of the individual components. Housing 34 forms the external housing of inductive charging device 10. In the embodiment of FIG. 7, housing 34 is formed from two housing elements 72, 74. Housing element 74 forms an upper housing element. Upper housing element 74 of inductive charging device 10 has a receptacle region 22 that is provided to accommodate induction accumulator 14 in a coupled state (FIG. 1). Receptacle region 22 of upper housing element 74 of inductive charging device 10 has at least one recess. The recess forms a positioning element 40 for positioning induction accumulator 14. Housing element 72 forms a lower housing element. Lower housing element 72 and upper housing element 74 enclose an internal region 76 of inductive charging device 10 for accommodating inductive charging unit 11 and electronics unit 78. Electronics unit 78 is provided to control or to regulate a charging process. Electronics unit 78 includes at least one circuit board 79 equipped with electronic components.

Figure 8:
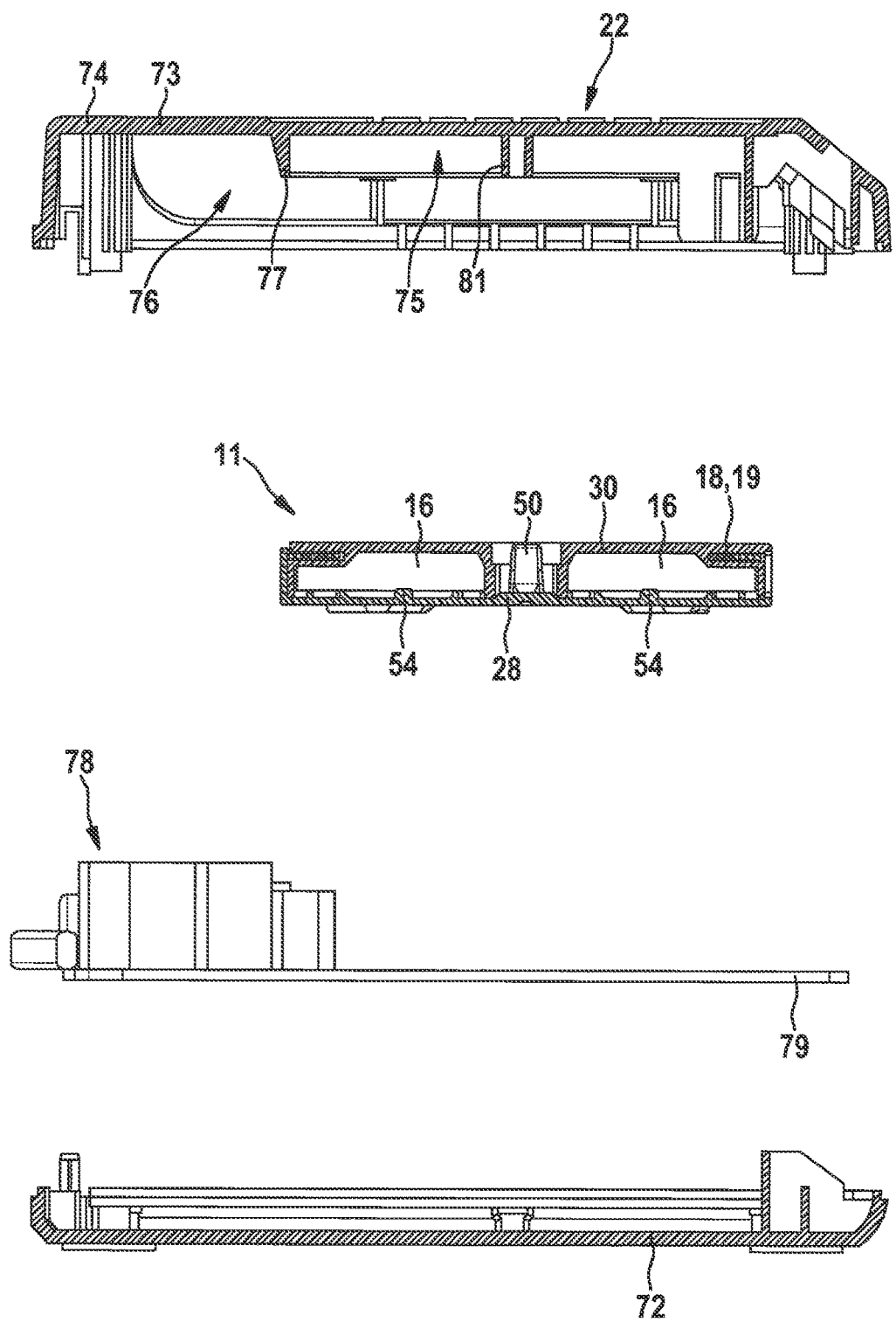
FIG. 8 shows the inductive charging device according to the present invention before assembly of the components, in longitudinal section.
Figure 9:
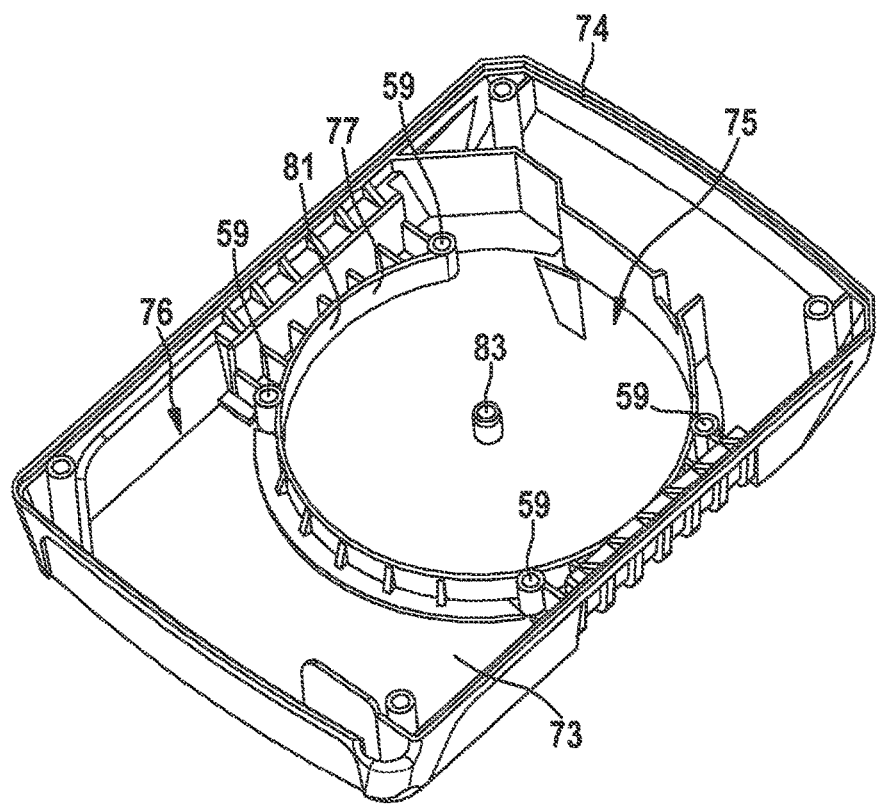
FIG. 9 shows a housing element of the inductive charging device according to the present invention, in a perspective representation.

FIG. 8 shows inductive charging device 10 before assembly in a longitudinal section through the individual components. Upper housing element 74 has a receptacle region 75 for accommodating inductive charging unit 11. Receptacle region 75 forms a sub-region of internal region 76 of inductive charging device 10. Receptacle region 75 is provided on an inner side, pointing inwardly toward inner region 76, of an upper housing wall 73 of housing element 74. Receptacle region 75 is situated in a region, situated opposite receptacle region 22, on the inner side of housing wall 73. Receptacle region 22 is provided on the outer side of housing wall 73 and receptacle region 75 is provided on the inner side of housing wall 73, receptacle region 22 and receptacle region 75 being situated opposite one another relative to housing wall 73. Receptacle region 75 is fashioned to position inductive charging unit 11 relative to receptacle region 22. For this purpose, on the inner side of housing wall 73 there are provided wall elements 77 that stand out from housing wall 73 and protrude into internal region 76. Wall elements 77 are integrally formed on the inner side of housing wall 73. Wall elements 77 limit receptacle region 75 in its peripheral direction. Wall elements 77 limit receptacle region 75 in its peripheral direction generally completely, as is shown in FIG. 9. Here, wall elements 77 match, generally in complementary fashion, the outer shape of inductive charging unit 11 in the peripheral direction. In the specific embodiment depicted in FIG. 9, wall elements 77 form a generally closed peripheral wall 81 that matches coil housing unit 24 generally in complementary fashion. In the assembled state of inductive charging unit 11 on housing element 74, wall elements 77 generally completely enclose coil housing unit 24 in peripheral direction 42. In an alternative embodiment (not shown), it would be possible to provide wall elements that incompletely limit receptacle region 75 in the peripheral direction. This can be realized for example in that the wall elements are interrupted. In addition, in the specific embodiment according to FIG. 9 a positioning element 83 is provided that, in the assembled state of inductive charging unit 11 on housing element 74, engages in locking opening 50 of coil housing unit 24. Positioning element 83 is integrally formed on inner side of housing wall 73 in such a way that it stands out from housing wall 73 on the inner side of housing wall 73, and protrudes into internal region 76. Positioning element 83 is fashioned to position inductive charging unit 11 relative to housing element 74.

For the detachable fastening of inductive charging unit 11 to housing 34 of inductive charging device 10, and thus for the positionally secure positioning of inductive charging unit 11 relative to receptacle region 22, holding elements 59 are provided on housing element 74. Holding elements 59 work together with holding elements 56, 58 provided on coil housing elements 28, 30. In the specific embodiment shown in FIG. 9, holding elements 59 are fashioned as screw bosses.

Figure 10:
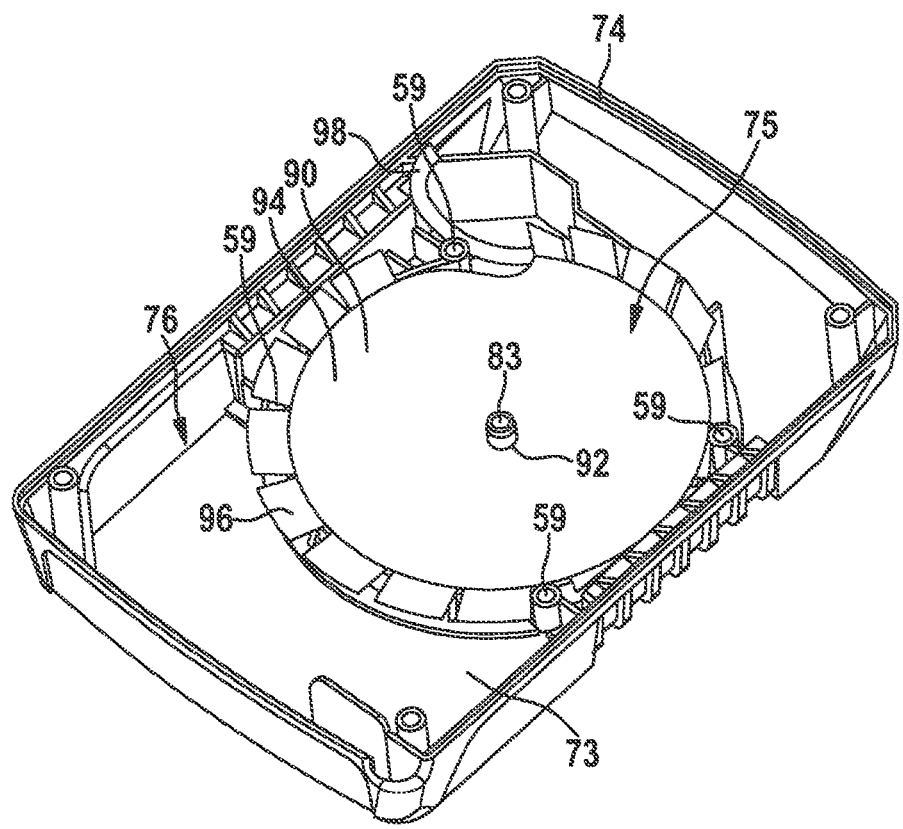
FIG. 10 shows the housing element of FIG. 9 with a specific embodiment of a first shielding element.

FIG. 10 shows housing element 74 according to FIG. 9, in which a shielding element 90 is situated. For the functioning of shielding element 90 it is important that shielding element 90 be situated in inductive charging device 10 between coil unit 12 and receptacle region 22, in particular between induction coil 18 and receptacle region 22. Here, a side of shielding element 90 faces receptacle region 22, while the other, opposite side of shielding element 90 faces induction coil 18. Thus, during a charging process of an induction accumulator 14 with inductive charging device 10, shielding element 90 is situated between inductive coil 18 and induction accumulator 14, or between induction coil 18 and an induction coil of induction accumulator 14. For the functioning of shielding element 90, it is advantageous if the distance between induction coil 18 and shielding element 90 is as small as possible.

Figure 13:
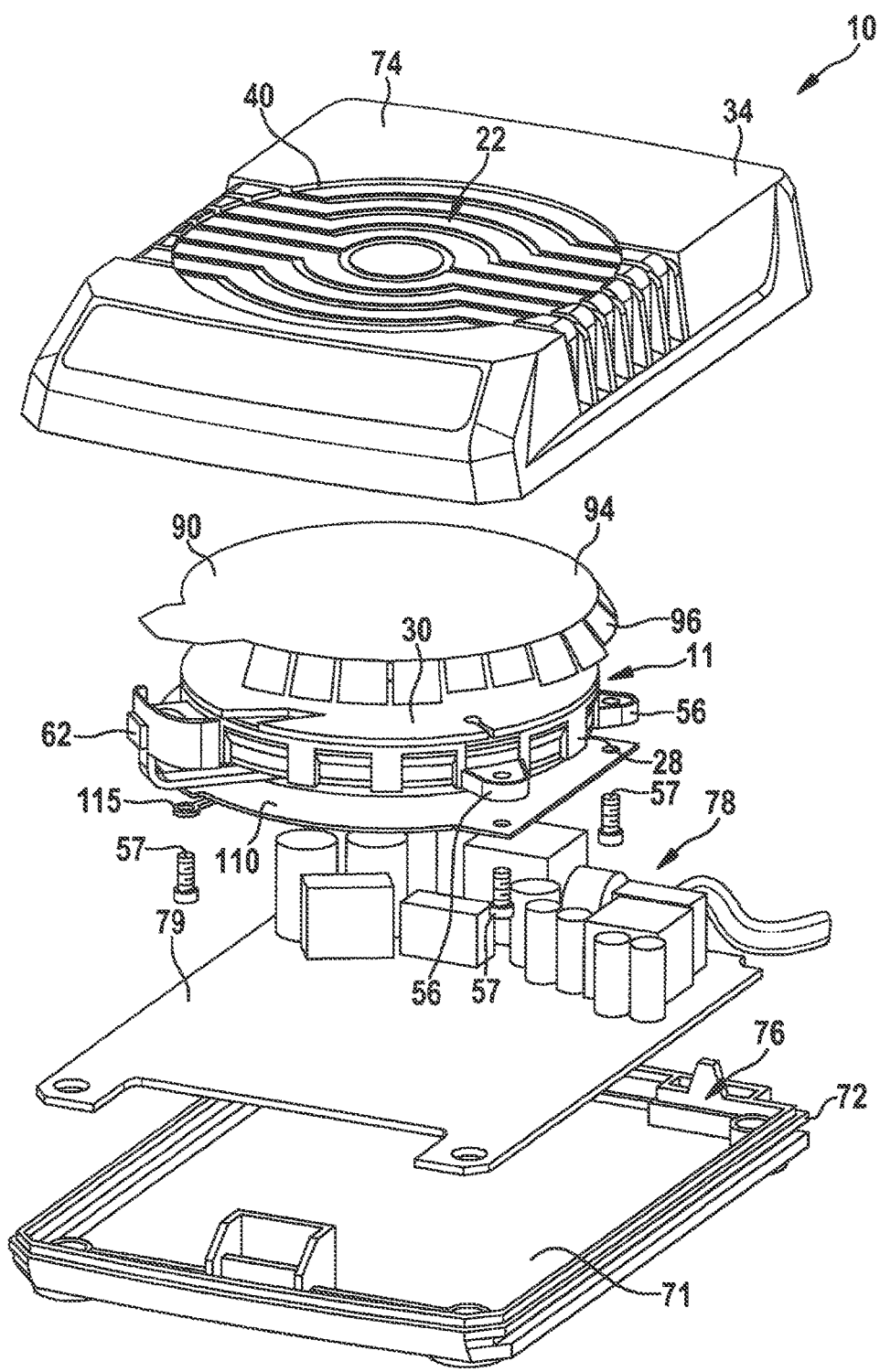
FIG. 13 shows the inductive charging device according to the present invention before assembly of the components, in a perspective representation.

In the specific embodiment depicted in FIG. 10, regarded together with FIG. 13, the situation of shielding element 90 between receptacle region 22 and induction coil 18 takes place in such a way that shielding element 90 is situated between housing element 74 and inductive charging unit 11. Here, shielding element 90 is situated outside inductive charging unit 11. Shielding element 90 is situated between coil housing unit 24 and housing element 74. Shielding element 90 is situated between coil housing element 30 of coil housing unit 24 and housing element 74. Shielding element 90 is situated between an inner side of housing wall 73 and the outer side, facing housing wall 73, of coil housing element 30. Thus, the distance between shielding element 90 and induction coil 18 corresponds generally to the thickness of the housing wall of coil housing element 30, which is situated between induction coil 18 and shielding element 90. In an alternative specific embodiment (not shown) shielding element 90 can also form an element of inductive charging unit 11, in that shielding element 90 is situated inside inductive charging unit 11. Here, shielding element 90 can be situated in coil housing unit 24. Here, it can be situated in particular in coil housing element 30, which accommodates induction coil 18.

Shielding element 90 is situated in receptacle region 75 of housing element 74. Here, shielding element 90 is positioned relative to receptacle region 75 with the aid of positioning element 83. For this purpose, shielding element 90 has an opening 92 that accommodates positioning element 83 of housing element 74. With the aid of opening 92 and positioning element 83, shielding element 90 is positioned relative to housing element 74 or relative to receptacle region 75. In the installed state of inductive charging unit 11 in housing element 74, shielding element 90 is clamped between housing element 74 and coil housing unit 24 of inductive charging unit 11.

For the functioning of shielding element 90, it is advantageous if shielding element 90 has a surface extension that is as large as possible relative to the surface comprised by induction coil 18. Shielding element 90 has a surface extension that corresponds at least generally to the surface formed by induction coil 18. For this purpose, shielding element 90 has a floor element 94 whose surface corresponds generally to the surface formed by induction coil 18. Floor element 94 is in particular fashioned over the entire surface. Given a situation of shielding element 90 between receptacle region 22 and induction coil 18, or between receptacle region 22 and coil unit 12, in inductive charging device 10, shielding element 90 generally completely covers induction coil 18. Alternatively, the surface of shielding element 90 can also be larger than the surface comprised by induction coil 18. Here, the surface of floor element 94 can be larger than the surface formed by induction coil 18.

For the functioning of shielding element 90, it is further advantageous if shielding element 90 not only covers the surface of induction coil 18 facing receptacle region 22, but also encloses the outer peripheral surface of induction coil 18. For this purpose, shielding element 90 has a plurality of wall elements 96 that are situated on floor element 94. As can be seen in FIGS. 10 and 13, in the installed position of shielding element 90 in housing element 74, wall elements 96 are situated laterally on inductive charging unit 11, so that shielding element 90 generally completely laterally encloses induction coil 18 or coil unit 12. In the installed position, wall elements 96 form a generally closed peripheral wall that completely encloses induction coil 18 or coil unit 20 at its lateral external periphery. As described above, in the depicted specific embodiment shielding element 90 is situated outside coil housing unit 24, so that in the installed position shielding element 90 also at least partly encloses a lateral peripheral wall at least of coil housing element 30.

Figure 11A:
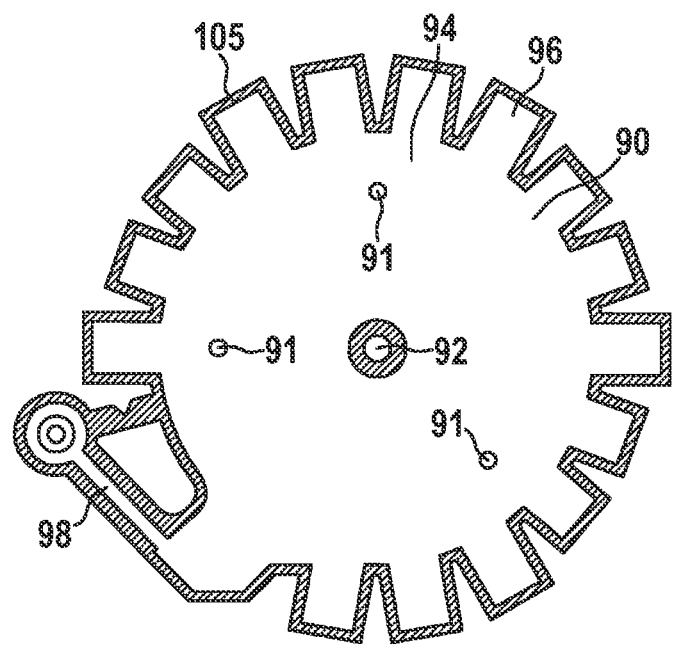
FIG. 11a shows the first shielding element according to FIG. 10, in a top view.
Figure 11B:
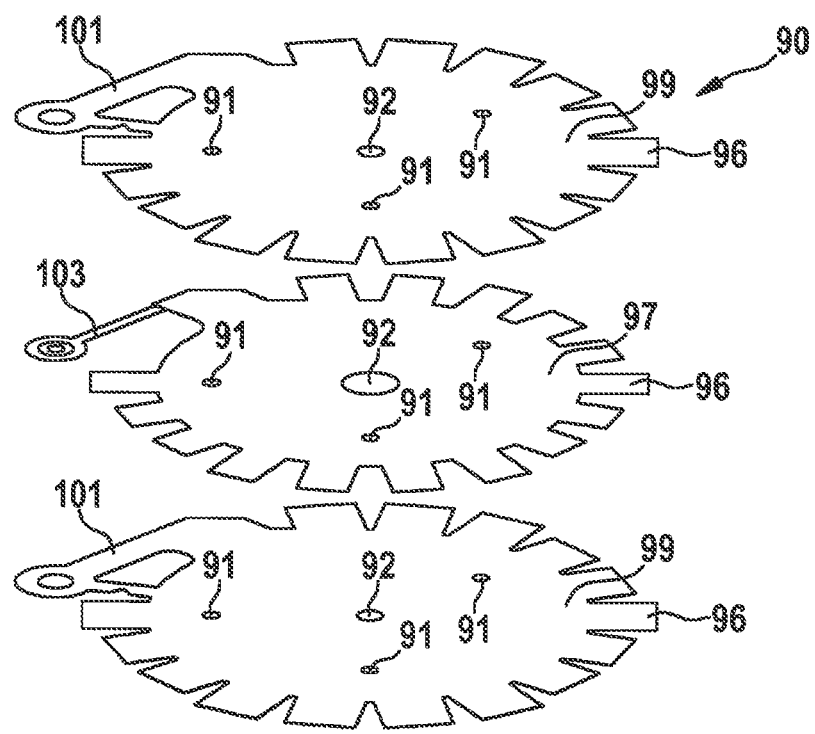
FIG. 11b shows the first shielding element according to FIG. 10 in an exploded representation.

In FIGS. 11*a* and 11*b*, shielding element 90 is shown in more detail. In the top view of FIG. 11*a*, floor element 94, which is generally disk-shaped, can be seen, having, approximately in its center, opening 92 for accommodating positioning element 83 of housing element 74. In addition, wall elements 96 standing out radially from floor element 94 can be seen. Wall elements 96 are fashioned in one piece with floor element 94. Wall elements 96 stand out radially from floor element 94, in the manner of lugs. As already described above, wall elements 96, in the installed position in inductive charging device 10, form a peripheral wall that stands out laterally from floor element 94. Here, wall elements 96 are situated so as to be inclined relative to floor element 94. In the installed position, they can for example be oriented generally perpendicular to floor element 94. Instead of a plurality of wall elements 96, a single wall element can also be provided that forms a generally closed lateral peripheral wall of shielding element 90 (not shown). Shielding element 90 has a generally round basic shape. Here, the basic shape of shielding element 90 is matched to the basic shape of induction coil 18. In a specific embodiment (not shown) in which the induction coil has a basic shape that is not round, for example an oval, rectangular, or square basic shape, the shielding element advantageously has a corresponding basic shape that is not round, being for example oval, rectangular, or square.

In addition, shielding element 90 includes an electrical contact element 98 that is fashioned to produce an electrical connection to shielding element 90. Contact element 98 is situated on floor element 94. It stands out outwardly from floor element 94 in the manner of a lug.

In FIG. 11*b*, it can be seen that shielding element 90 is fashioned as a thin shielding foil. In particular, it has a multilayer structure. In the depicted specific embodiment, shielding element 90 has three layers. The first layer and the third layer are each formed by an insulating element 99 in the form of an insulating foil. The second layer, situated between the first and the third layer, is formed by an electrically conductive element 97. Insulating elements 99 are made of an electrically non-conductive material. They are for example realized as plastic foils. The plastic can be for example polyester. The thickness of insulating foils 99 is for example less than 0.1 mm. Insulating foils 99 are fashioned to prevent electrical disruptive discharges between induction coil 18 and electrically conductive element 97. The disruptive strength of insulating elements 99 is for example more than 2 kV. Electrically conductive element 97 is made of an electrically conductive material. It has turned out that metallic, in particular ferromagnetic, materials are rather unsuitable for use as conductive material for conductive element 97. A non-metallic material, such as carbon, is advantageous for electrically conductive element 97. Electrically conductive element 97 can for example be realized as a fabric structure of carbon fibers, the fabric structure being formed by a textile, a mesh, a sheet, a knit fabric, a netting, a weave, a felt, a nonwoven mat, or the like.

For the purpose of positioning the two insulating elements 99 and electrically conductive element 97 relative to one another, each of the elements 97, 99 is provided with at least three positioning elements 91 in the form of positioning holes. During assembly of shielding element 90, positioning elements 91 act as an assembly aid for the precise orientation of the individual layers relative to one another. Given a configuration of insulating elements 99 and of electrically conductive element 97 one over the other, each positioning element 91 of one of the elements 97, 99 is configured so as to be aligned with at least one positioning element 91 of an adjacent element 97, 99.

In a peripheral edge region 105 of shielding element 90, insulating elements 99 are provided with a protrusion relative to electrically conductive element 97. In this edge region 105, the two insulating elements 99 abut one another directly, without electrically conductive element 97 being situated between them. In an edge region 105, insulating elements 99 are connected to one another in particular with a material bond, for example by gluing or welding, in particular immediately. Accordingly, edge region 105 is free of electrically conductive element 97. Edge region 105 is in particular completely free of electrically conductive material. Edge region 105 is fashioned to ensure the electrical disruptive strength. The edge region extends for example over at least 0.5 mm, going out from the outer edge of shielding element 90.

Electrical contact element 98, standing out in the manner of a lug from floor element 94, and which is fashioned for the electrical connection of shielding element 90, is also made up of three layers. A respective insulating lug 101 stands out from the floor elements of the two insulating elements 99. A contact lug 103 stands out from the floor element of electrically conductive element 97. Here, contact lug 103 is situated between the two insulating lugs 101. Insulating lugs 101 are fashioned in one piece with the floor elements of insulating elements 99. For contact lug 103, preferably a metallic material, for example a copper foil, is used. Here, contact lug 103 made of copper foil is connected in electrically conductive fashion to the fabric structure made of electrically conductive material of electrically conductive element 97.

Figure 12:
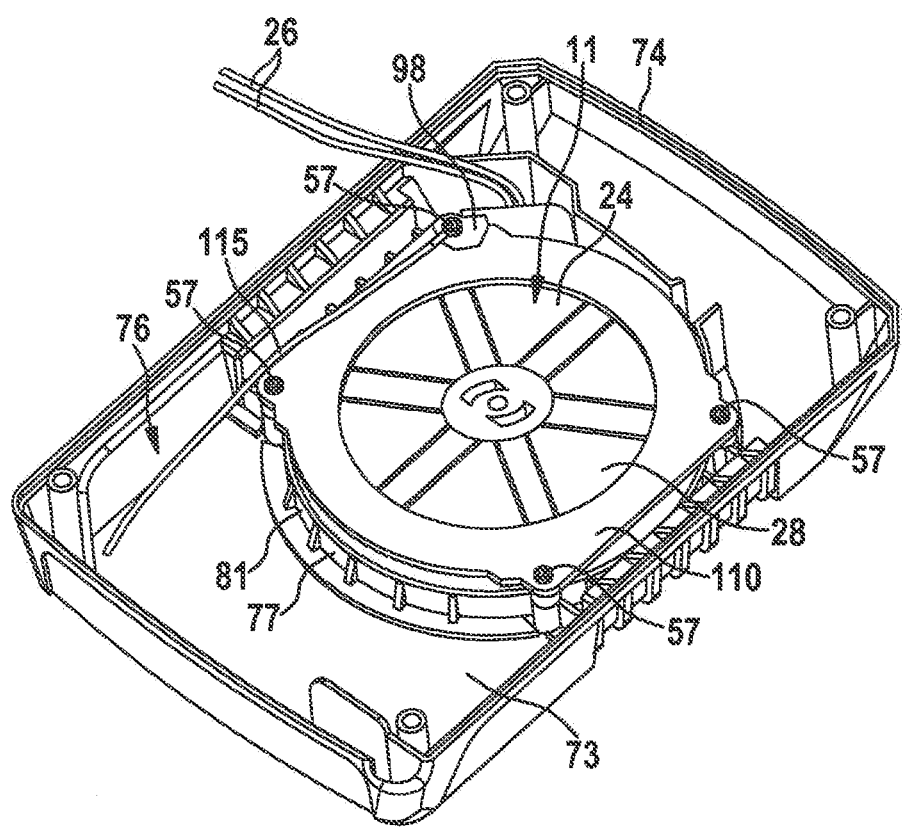
FIG. 12 shows the housing element according to FIG. 9 with an inductive charging unit and a specific embodiment of a second shielding element.

FIG. 12 shows housing element 74 according to FIG. 9, in which inductive charging unit 11 and a shielding element 110 are situated. For the functioning of shielding element 110, it is important that shielding element 110 in inductive charging device 10 be situated between coil unit 12 and housing element 72, in particular between induction coil 18 and housing element 72. Here, a side of shielding element 110 faces housing element 72, while the other, opposite side of shielding element 110 faces induction coil 18. Thus, during a charging process of an induction accumulator 14 with inductive charging device 10, shielding element 110 is situated between induction coil 18 and housing element 72. During the charging process, housing element 72 forms the lower housing element of inductive charging device 10, which forms a support surface for inductive charging device 10, for example on a table surface.

In the specific embodiment shown in FIG. 12, regarded together with FIG. 13, the situation of shielding element 110 between housing element 72 and induction coil 18 takes place in such a way that shielding element 110 is situated between housing element 72 and inductive charging unit 11. Here, shielding element 110 is situated outside inductive charging unit 11. Shielding element 110 is situated between coil housing unit 24 and housing element 72. Shielding element 110 is situated between coil housing element 28 and housing element 74. Shielding element 110 is situated between an inner side of housing wall 71 and the outer side, facing housing wall 71, of coil housing element 28. In an alternative specific embodiment (not shown), shielding element 110 can also form an element of inductive charging unit 11 in that shielding element 110 is situated inside inductive charging unit 11. Here, shielding element 110 can be situated in coil housing unit 24. It can in particular be situated in coil housing element 28, which faces housing element 72. Here, shielding element 110 can in particular be situated between coil housing element 28 and core unit 17, or core elements 16.

In the depicted specific embodiment, shielding element 110 is detachably fastened in inductive charging device 10 by fastening elements 57 in the form of screws. Fastening elements 57 work together with holding elements 59 of housing element 74. In this way, shielding element 110 is detachably fastened on housing element 74. As can be seen in FIG. 12, one of the fastening elements 57 also has the function of producing an electrically conductive connection between shielding element 110 and an electrical conductor 115 in the form of an electrical cable. Shielding element 110 is connected to ground via an electrical conductor 115. As FIG. 12 also shows, this fastening element 57 additionally has the function of producing an electrically conductive connection between contact element 98 of shielding element 90 and electrical conductor 115. Thus, shielding element 90 is also connected to ground via an electrical conductor 115.

Shielding element 110 is made of an electrically conductive material. It is advantageously made of a metallic material, for example aluminum. Shielding element 110 is fashioned to shield induction coil 18 against metallic objects situated on a support surface for inductive charging device 10, for example a table surface. A support surface made of a metallic material or metallic particles on the support surface disadvantageously influence the functioning of the induction coil 18.

In the specific embodiment shown in FIG. 12, shielding element 110 has a generally annular shape. In an alternative specific embodiment (not shown), the shielding element can also be fashioned with a disk shape. Here, in particular the shielding element can be fashioned generally over the entire surface. In order to achieve an adequate mechanical stability, shielding element 110 has for example a thickness of approximately 1 mm, but shielding element 110 can also have a significantly smaller thickness. The shielding function of shielding element 110 can for example also be achieved by a shielding foil. A shielding foil can for example be glued onto coil housing element 28.

For the functioning of shielding element 110, it is advantageous if shielding element 110 has a surface extension that is as large as possible, relative to the surface comprised by induction coil 18. Shielding element 110 has a surface extension that corresponds at least generally to the surface formed by induction coil 18. Generally circular shielding element 110 has an outer diameter that is at least as large as the outer diameter of induction coil 18. In an alternative specific embodiment, in which induction coil 18 is not circular, but rather is fashioned with an oval, rectangular, or square shape, the geometric basic shape of shielding element 110 is advantageously matched to the basic shape of induction coil 18. Here, a projection surface of shielding element 110, formed by a projection of shielding element 110 along axial direction 46, is at least as large as the projection surface of induction coil 18 formed by a projection of induction coil 18 along axial direction 46.

What is claimed is:

1. A handheld power tool inductive charging device, comprising:
   a housing;
   a receptacle region for accommodating an induction accumulator;
   a coil unit situated in the housing, the coil unit including at least one core element and at least one induction coil that at least partly encloses the at least one core element; and
   a first coil housing element that positions at least the coil unit relative to the receptacle region in the housing.

2. The inductive charging device as recited in claim 1, wherein the first coil housing element has at least one opening for accommodating the at least one induction coil.

3. The inductive charging device as recited in claim 1, wherein the first coil housing element has at least one receptacle region for accommodating the at least one core element.

4. The inductive charging device as recited in claim 1, wherein the first coil housing element has at least one holding element for detachable fastening to the housing.

5. The inductive charging device as recited in claim 1, further comprising:
   a second coil housing element that forms with the first coil housing element a coil housing unit.

6. The inductive charging device as recited in claim 5, wherein the coil housing unit includes at least one connecting element that detachably connects the first coil housing element and the second coil housing element to one another in an assembled state.

7. The inductive charging device as recited in claim 6, wherein the connecting element is fashioned as a locking element.

8. The inductive charging device as recited in claim 5, further comprising:

at least one spring element that is at least partly provided to apply a force to the at least one core element acting at least partly toward the at least one induction coil.

9. The inductive charging device as recited in claim 8, wherein the at least one spring element exerts a force in a direction of the receptacle region on the at least one core element.

10. The inductive charging device as recited in claim 8, wherein the at least one spring element and at least one of the first and second coil housing elements work together in such a way that the at least one core element is pre-tensioned toward the at least one induction coil.

11. The inductive charging device as recited in claim 10, wherein at least one of the first and second coil housing elements includes the at least one spring element.

12. The inductive charging device as recited in claim 11, wherein the at least one spring element is fixedly connected to at least one of the first and second coil housing elements.

13. The inductive charging device as recited in claim 11, wherein the at least one spring element is fashioned in one piece with at least one of the first and second coil housing elements.

14. The inductive charging device as recited in claim 1, wherein the coil unit has a plurality of core elements, identical in shape, and a plurality of spring elements, identical in shape, are provided which respectively apply a force to one of the core elements acting at least partly toward the at least one induction coil.

15. The inductive charging device as recited in claim 1, wherein the at least one induction coil includes at least two coil terminals that are situated at a distance from one another.

16. The inductive charging device as recited in claim 1, further comprising:

a shielding element is provided that is fashioned to reduce electromagnetic interference.

17. The inductive charging device as recited in claim 16, wherein the shielding element is situated between the receptacle region and the induction coil.

18. The inductive charging device as recited in claim 16, wherein the shielding element is situated between the receptacle region and the first coil housing element.

19. The inductive charging device as recited in claim 16, further comprising:

a further shielding element is provided that is fashioned to reduce electromagnetic interference.

20. The inductive charging device as recited in claim 19, wherein the further shielding element is situated between the housing element and the induction coil.

21. The inductive charging device as recited in claim 19, wherein the further shielding element is situated between the housing element and the first coil housing element.

22. A system, comprising:

an inductive charging device, including:

a housing, a receptacle region for accommodating an induction accumulator, a coil unit situated in the housing, the coil unit including at least one core element and at least one induction coil that at least partly encloses the at least one core element, and a first coil housing element that positions at least the coil unit relative to the receptacle region in the housing; and a handheld power tool induction accumulator.

* * * * *